United States Patent [19]

Numoto et al.

[11] Patent Number: 5,552,123

[45] Date of Patent: Sep. 3, 1996

[54] CATALYST DEVICE AND COMBUSTION APPARATUS PROVIDED THEREWITH

[75] Inventors: Hironao Numoto, Ikoma; Tetuo Terashima, Neyagawa, both of Japan

[73] Assignee: Matsushita Electric Industrial Co., Ltd., Osaka-fu, Japan

[21] Appl. No.: 230,845

[22] Filed: Apr. 21, 1994

[30] Foreign Application Priority Data

Apr. 22, 1993 [JP] Japan .................................. 5-094702

[51] Int. Cl.⁶ .................................................. B01D 53/34
[52] U.S. Cl. ...................... 422/180; 422/177; 422/211; 422/222; 60/299; 502/439; 502/527
[58] Field of Search ............................ 422/211, 180, 422/177, 179, 222; 60/299; 502/527, 439

[56] References Cited

U.S. PATENT DOCUMENTS

| | | | |
|---|---|---|---|
| 3,770,389 | 10/1973 | Kitzner et al. | 422/174 |
| 4,280,926 | 7/1981 | Abe et al. | 502/527 |
| 5,137,696 | 8/1992 | Hitachi et al. | 60/299 |
| 5,155,994 | 10/1992 | Muraki et al. | 422/180 |

*Primary Examiner*—Robert J. Warden
*Assistant Examiner*—Hien Tran
*Attorney, Agent, or Firm*—Wenderoth, Lind & Ponack

[57] ABSTRACT

A catalyst device is used for a combustion apparatus. The catalyst device is provided with multiple gas flow channels. The gas flow channels are formed by corrugated sheets and flat sheets which are alternatively laminated. One of the sheets is a paper sheet mainly composed of inorganic heat-resistant fibers carrying catalyst metal dispersed thereon, and the other sheet is provided with a thin metal plate. Therefore, the combustion apparatus provided with the catalyst device has a shortened preheating time, produces a reaction heat which is uniform over all the catalyst layers and maintains the stabilized performance for a long time.

24 Claims, 5 Drawing Sheets

CATALYST DEVICE AND COMBUSTION APPARATUS PROVIDED THEREWITH

BACKGROUND OF THE INVENTION

1. Field of the Invention

The present invention relates generally to a catalyst device and a combustion apparatus provided therewith, particularly to a catalyst device for purifying or deodorizing domestic or industry exhaust gas and also to the combustion apparatus provided with such a catalyst device.

2. Description of Related Art

Conventionally, the catalyst device generally comprises a honeycomb structure substrate made of ceramics such as cordierite or mullite, which is coated by an activated alumina called a "washcoat" on which surface of the catalyst device is then dispersed a catalyst metal powder. Further, a corrugated alumina/silica fiber or thin metal structure provided with the catalyst metal on the surface thereof has been sometimes used.

However, the honeycomb structure made of ceramics is beset by the following problems: 1) it takes a relatively long time to preheat the catalyst device up to a sufficient temperature because of its large heat capacity; 2) it is difficult to transfer a reactive heat from an upstream part of the catalyst device to a downstream thereof because of its poor heat conductivity in use of combustion catalyst; and 3) the corrugated structure made of alumina/silica fiber is easily broken because of its brittleness. On the other hand, in the case of a thin metal structure, although it is not easily broken, it also takes a long time to preheat the catalyst device because its good heat conductivity causes heat dispersion. Further, in the case of the alumina/silica fibers mixed with metal fibers, it is difficult for it to resist high temperatures of about 1000° C. and it is also difficult to prepare a uniform structure in mass production due to drift tendencies of metal fibers.

In the catalyst combustion, a liquid fuel, such as petrol, premixed with air is suddenly oxidized on the catalyst layer to generate reaction heat and gas such as carbon dioxide and steam. The catalyst reaction usually occurs only at the upstream side near the catalyst device during the first stage, and a continuous high temperature under an oxidizing condition promotes deterioration of the upstream part. Accordingly, in order to prolong the life of the catalyst layer it is necessary to make a temperature difference between the upstream and the downstream parts as small as possible. Further, it is required to make the preheating time for activating the catalyst as short as possible, and thus it is necessary to make the heat capacity of the catalyst device as small as possible.

SUMMARY OF THE INVENTION

The present invention has been developed to overcome the above-described disadvantages.

It is accordingly an objective of the present invention to provide a catalyst device for which the preheating time is shortened, the reaction heat is made uniform over all the catalyst layers, and stable performance can be maintained for a long time.

Another objective of the present invention is to provide a catalyst combustion apparatus provided with the above catalyst device in a combustion zone.

In accomplishing the above and other objectives, according to a first aspect of the present invention, there is provided a catalyst device provided with multiple gas flow channels in a longitudinal direction, in which corrugated sheets and flat sheets are alternatively laminated to provide the multiple gas flow channels. One of the sheets is a paper sheet mainly composed of an inorganic heat-resistant fiber carrying catalyst metal dispersed thereon and the other sheet is provided with a thin metal plate.

According to the present invention, there is provided the following functions and effects.

1) The catalyst metal can be easily preheated up to a desired temperature for a shorter time than the conventional case since the present catalyst device is made of a composite material which comprises a paper layer mainly composed of heat-resistant inorganic fibers having a small heat capacity and a thin metal layer having a superior heat conductivity.

2) It is possible to make the temperature difference between the upstream and the downstream parts of the catalyst device small, resulting in prolonged life of the catalyst, since the reaction heat generated by the catalyst combustion can be transferred through the metal layer having a superior heat conductivity.

3) The composite material can be mass-produced because the composite construction can be formed by bonding the thin metal layer with the paper layer.

In the catalyst device according to the present invention, each of the corrugated sheet and the flat sheet comprises a single layer (e.g. FIG. 2) or laminated layers (e.g. FIG. 1). In the latter case, it is preferred that at least one of the laminated layers is an inorganic heat-resistant fiber layer (paper layer) 2 carrying catalyst metal dispersed thereon and the other of the laminated layers is a thin metal layer 1, as shown in FIG. 1. The catalyst metal dispersed on the paper layer ranges preferably from 0.3 to 1.2 g/cc of the bulk density. The paper layer of the laminated sheet is 0.02 to 1 mm thick and the other metal layer is 0.02 to 0.1 mm thick.

In a case of three laminated layers, it is preferred that the outer two layers are the paper layers while the inside layer is the thin metal layer. In the case of single layer sheets, the corrugated sheet is a single layer 2 of the inorganic heat-resistant fiber with catalyst metal dispersed thereon and the flat sheet is a thin metal single layer 1 as shown FIG. 2. The catalyst metal dispersed on the paper layer 2 ranges preferably from 0.5 to 1.5 g/cc of the bulk density. The paper sheet 2 may be 0.3 to 1 mm thick and the metal sheet 1 may be 0.02 to 0.1 mm thick.

The catalyst metal may be a noble metal and is usually carried on the inorganic heat-resistant fibers before making the paper from the fibers.

Furthermore, according to a second aspect of the present invention there is provided a combustion apparatus which is designed to burn a mixture of fuel and air on a catalyst device provided with multiple gas flow channels for a combustion zone, which is positioned between a mixing room for providing the fuel and air mixture and an outlet for exhausting a combustion gas from the combustion zone. The catalyst device comprises corrugated sheets and flat sheets alternatively laminated to provide the multiple gas flow channels. One of the sheets is a paper sheet mainly composed of an inorganic heat-resistant fiber with catalyst metal dispersed thereon, and the other sheet is provided with a thin metal plate.

BRIEF DESCRIPTION OF THE DRAWINGS

The above and other objectives and features of the present invention will become more apparent from the following

Figure 1:
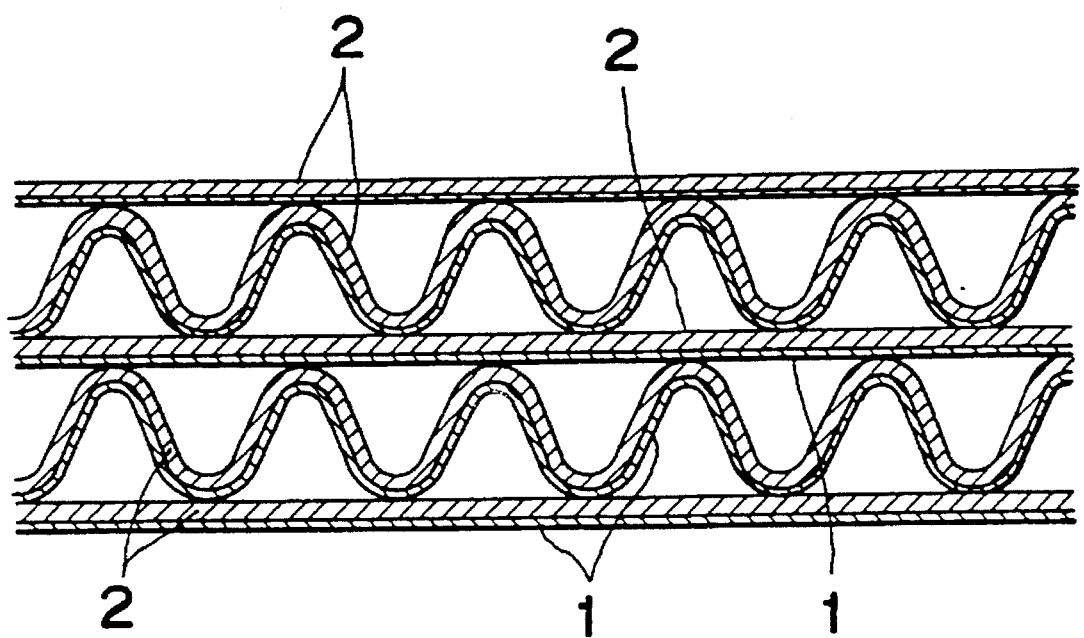
Figure 2:
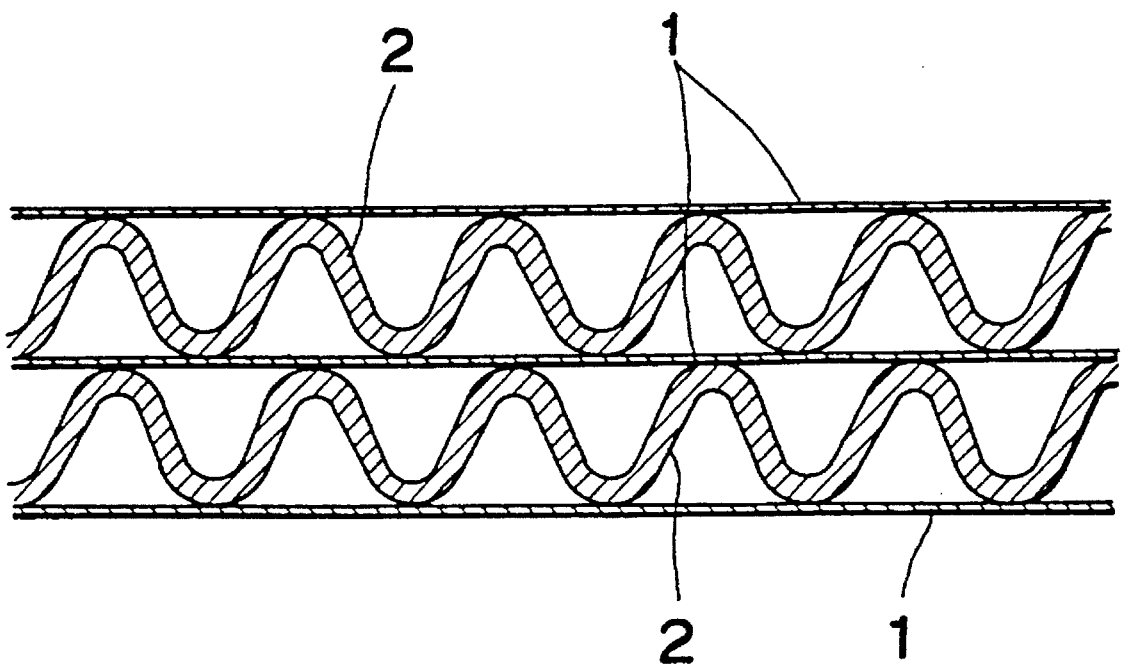
Figure 3:
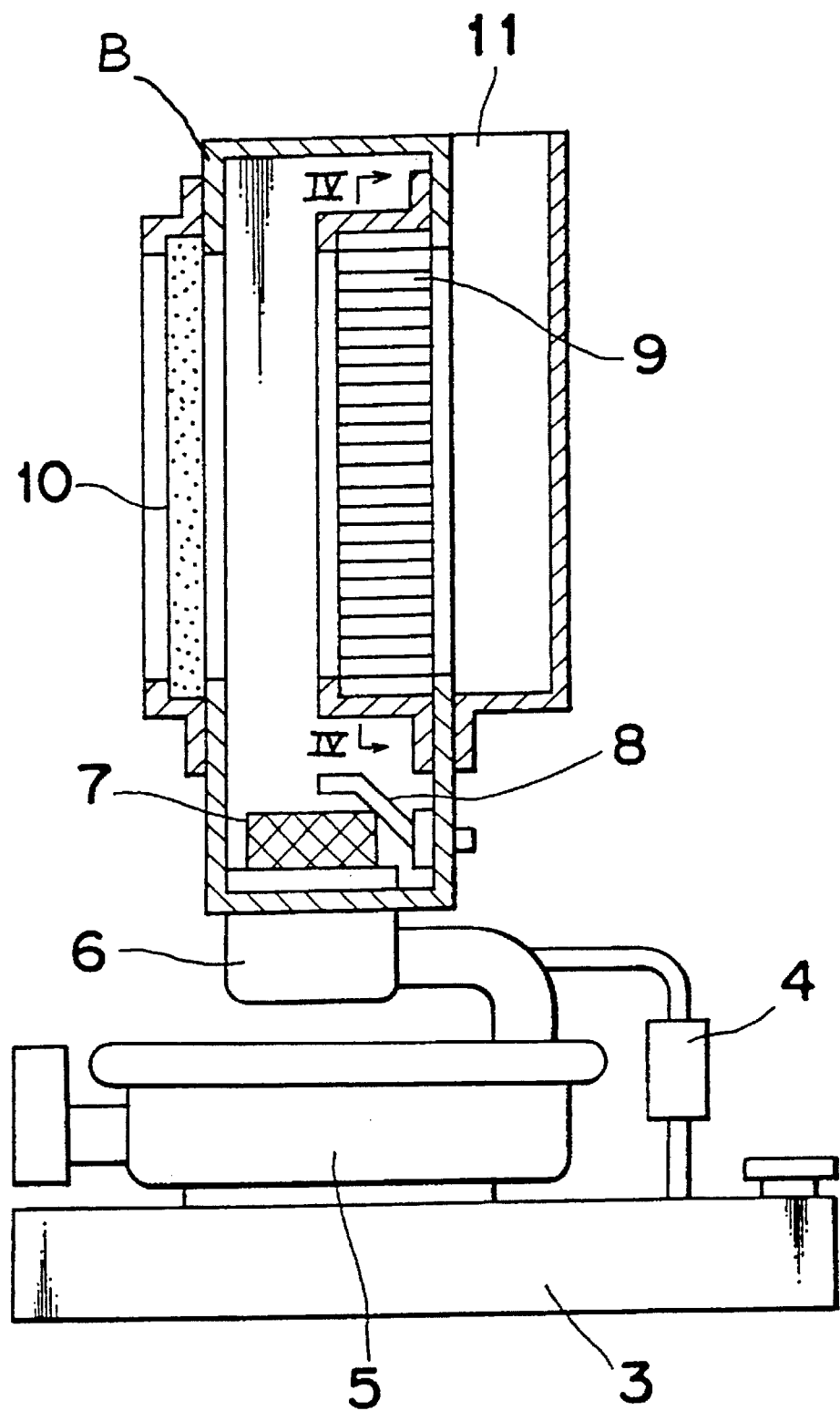
Figure 4:
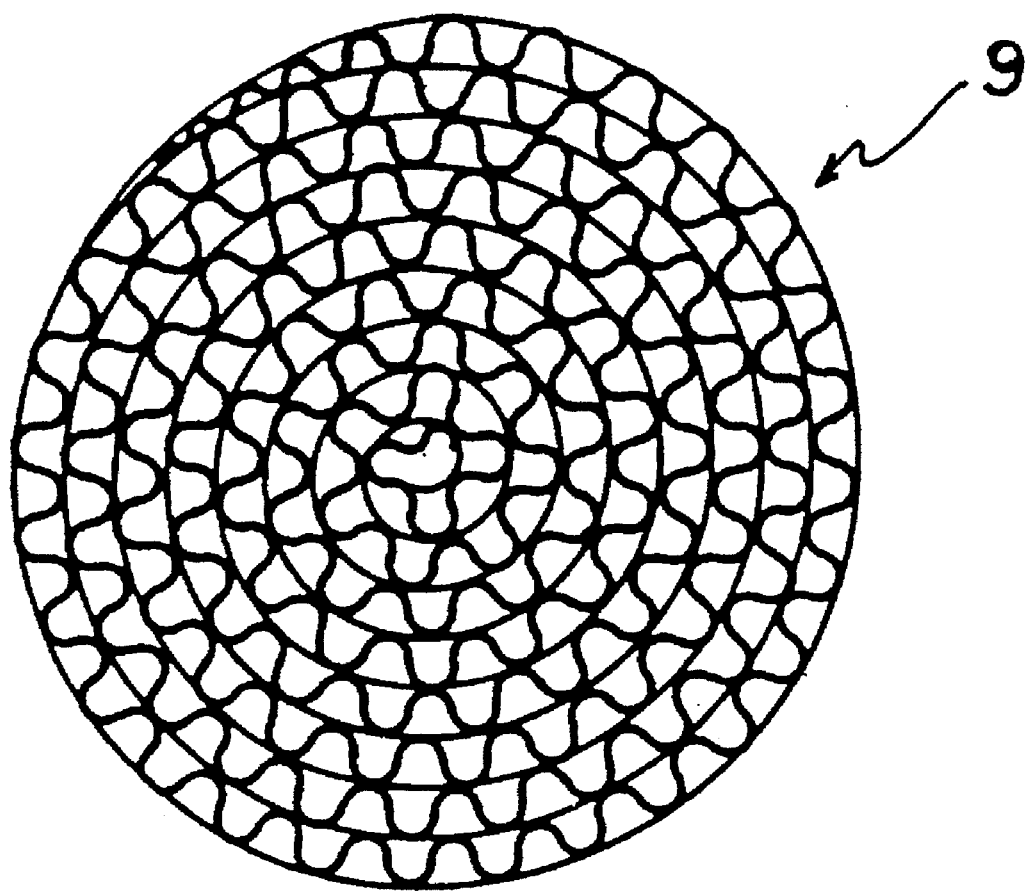
Figure 5:
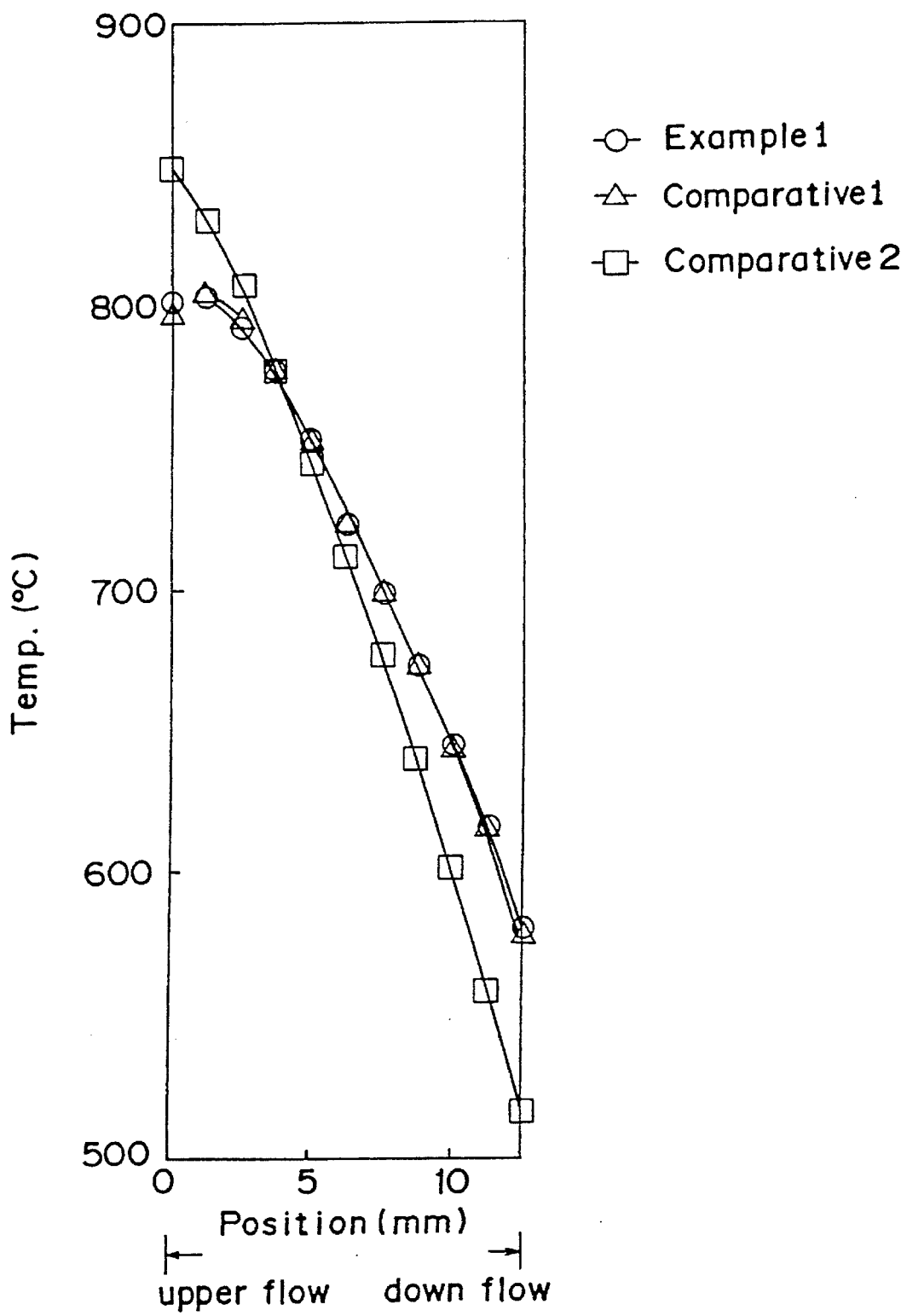

3 description of a preferred embodiment thereof with reference to the accompanying drawings, throughout which like parts are designated by like reference numerals, and wherein:

FIG. 1 is a sectional view of a catalyst device having a laminated layer according to another embodiment of the present invention;

FIG. 2 is a sectional view of a catalyst device having a single layer according to another embodiment of the present invention;

FIG. 3 is a partially sectional outline view of a catalyst combustion apparatus provided with the catalyst device according to the present invention;

FIG. 4 is a sectional view along line IV—IV of FIG. 3;

FIG. 5 is a graph showing a temperature distribution from the upstream part to the downstream part of a catalyst layer at a first stage of Example 1, and Comparative Examples 1 and 2.

DETAILED DESCRIPTION OF THE PREFERRED EMBODIMENTS (Example 1)

A small volume of aluminum sulfate is added to a suspension comprising 1) alumina/silica fibers (alumina 60 wt. %, silica 40 wt. %; average fiber length about 15 mm, fiber diameter about 2 μm), 2) $BaO.Al_2O_3.CeO_2$ powder carrying Pt and Pd ($Al_2O_3$ 80 wt. %, specific surface area 150 m$^2$/g), 3) alumina sol, 4) pulp and 5) water. Due to pH adjustment to 5.5 by ammonia, the suspension is primarily aggregated. Then, due to a small volume of polyacrylamide added thereto, the suspension is secondarily aggregated. From the aggregated suspension, a paper sheet 2 of 0.20 mm thick is made by a Fourdrinier machine. Before the paper sheet 2 completely loses the water, the paper is laminated on a surface of an Fe-Cr-Al thin plate 1 (thickness: 50 μm) and corrugated.

FIG. 1 shows an enlarged sectional view of the corrugated catalyst layers. The layers are subjected to a heat-treatment at 900° C. for 2 hours to heat-decompose an organic component in the paper 2 and simultaneously bond the ceramic paper onto the metal substrate 1. The resulting catalyst device has dimensions of 150ϕ×12.5 mm, which corresponds to an order of 400 cell/inch$^2$.

(Example 2)

A small volume of aluminum sulfate is added to a suspension comprising 1) alumina/silica fiber (alumina 60 wt. %, silica 40 wt. %; average fiber length about 15 mm, fiber diameter about 2 μm), 2) alumina sol, 3) pulp and 4) water. Due to pH adjustment to 5.5 by ammonia, the suspension is primarily aggregated. Then, due to a small volume of polyacrylamide added thereto, the suspension is secondarily aggregated. From the aggregated suspension, a paper 2 of 0.20 mm thick is made by a Fourdrinier machine. Before the paper completely loses the water, the paper is laminated on a surface of an Fe-Cr-Al thin plate 1 (thickness: 50 μm) and corrugated.

The layers are subjected to a heat-treatment at 900° C. for 2 hours to heat-decompose an organic component in the paper and simultaneously bond the ceramic paper onto the metal substrate. The resulting catalyst device has dimensions of 150ϕ×12.5 mm, which corresponds to an order of 400 cell/inch$^2$.

$BaO.Al_2O_3.CeO_2$ powder ($Al_2O_3$ 80 wt. %, specific surface area 120 m$^2$/g), aluminum nitrite $9H_2O$, water, dinitro diammine platinum ($Pt(NO_2)_2(NH_3)_2$) aqueous solution and dinitro diammine Palladium ($Pa(NO_2)_2(NH_3)_2$) aqueous solution are mixed to give a washcoat slurry, which is applied to the corrugated catalyst structure to form a catalyst coating layer thereon.

(Example 3)

A small volume of aluminum sulfate is added to a suspension comprising 1) alumina/silica fiber (alumina 60 wt. %, silica 40 wt. %; average fiber length about 15 mm, fiber diameter about 2 μm), 2) alumina sol, 3) pulp and 4) water. Due to pH adjustment to 5.5 by ammonia, the suspension is primarily aggregated. Then, due to a small volume of polyacrylamide added thereto, the suspension is secondarily aggregated. From the aggregated suspension, a corrugated paper 2 of 0.25 mm thick is made by a Fourdrinier machine. The paper is sandwiched between a pair of Fe-Cr-Al thin plates 1 (thickness: 50 μm). FIG. 2 shows an enlarged sectional view of the resulting corrugated layers.

The layers are subjected to a heat-treatment at 1000° C. for 2 hours to give a catalyst device having dimensions of 150ϕ×12.5 mm, which corresponds to an order of 400 cell/inch$^2$.

$BaO.Al_2O_3.CeO_2$ powders ($Al_2O_3$ 80 wt. %, specific surface area 120 m$^2$/g), aluminum nitrite $9H_2O$, water, dinitro diammine platinum aqueous solution and dinitro diammine Palladium aqueous solution are mixed to give a washcoat slurry, which is applied to the corrugated catalyst structure to form a catalyst coating layer thereon.

(Comparative Example 1)

The washcoat slurry made in Example 2 is applied to a honeycomb ceramic carrier (150ϕ×12.5 mm, 400 cell/inch$^2$, thickness 0.20 mm) to form a catalyst coating thereon.

(Comparative Example 2)

A small volume of aluminum sulfate is added to a suspension comprising 1) alumina/silica fiber (alumina 60 wt. %, silica 40 wt. %; average fiber length about 15 mm, fiber diameter about 2 μm), 2) alumina sol, 3) pulp and 4) water. Due to pH adjustment to 5.5 by ammonia, the suspension is primarily aggregated. Then, due to a small volume of polyacrylamide added thereto, the suspension is secondarily aggregated. From the aggregated suspension, a paper of 0.20 mm thick is made by a Fourdrinier machine and corrugated.

The layers are subjected to a heat-treatment at 900° C. for 2 hours to give a catalyst device having dimensions of 150ϕ×12.5 mm, which corresponds to an order of 400 cell/inch$^2$.

$BaO.Al_2O_3.CeO_2$ powder ($Al_2O_3$ 80 wt. %, specific surface area 120m$^2$/g), aluminum nitrite $9H_2O$, water, dinitro diammine platinum aqueous solution and dinitro diammine Paradium aqueous solution are mixed to give a washcoat slurry, which is applied to the corrugated catalyst structure to form a catalyst coating layer thereon.

A combustion apparatus shown in FIG. 3 is assembled by using the resulting catalyst device in a combustion zone. The apparatus comprises a main body B, fuel tank 3, a fuel supply pump 4, a fan 5, a mixing room (or mixing chamber)

6, a complementary flame opening 7 positioned at outlet of the mixing room 6, an ignition electrode 8 mounted near a flame opening 7. Above the flame opening 7, a catalyst device 9 is mounted upright and comprises a corrugated structure provided with multiple flow channels extending from left to right in FIG. 3. The catalyst device 9 is made of the composite material comprising corrugated paper layers 2 mainly composed of inorganic fiber, and metal thin plates 1, as depicted in FIG. 1 of FIG. 2 and as generally shown in FIG. 4. Opposite to the front face or the upstream face of the catalyst device 9, there is mounted a heat transmitting plate 10 and at the downstream side there is mounted an outlet 11.

In the apparatus, liquid fuel is supplied by the pump 4 and air is supplied by the fan 5 to the mixing room 6. In the mixing room 6, the fuel is evaporated and is premixed with the air and then is supplied to the flame opening 7. The fuel mixture air is ignited by the ignition electrode 8 and begins to burn. A high temperature exhaust gas flows upward and heats the catalyst device 9. When the catalyst device is heated to an elevated temperature, the fuel supply is stopped to extinguish the flame at the flame opening 7. Then, when the fuel supply is again started, the premixed fuel air from the mixing room 6 reaches an inlet of the catalyst device. Due to the elevated temperature of the catalyst device, a catalyst combustion begins mainly at the upstream side of the catalyst device 9 and spreads to the downstream side. Further, reaction heat generated on the upstream side transmits through the heat transmitting plate 10. A part of the reaction heat may heat the heat transmitting plate 10, resulting in secondary heat discharge from the front face.

A test for evaluating the resulting catalyst device is carried out. A comparison can be done with respect to the time necessary for preheating it up to a catalyst activating temperature and with respect to the performance after a continuous combustion life test at 2000 kcal/h and air/kerosene ratio=2.0. The performance evaluation can be done by comparison of the ratio of maximum fuel consumption/minimum fuel consumption in a good combustion range where the $HC/O_2$ property of the exhaust gas is less than $1 \times 10^4$. The larger the ratio is, the larger is the range for good combustion. The $CO/CO_2$ property of exhaust gas is good in a larger range than that of the $HC/O_2$ property.

Table 1 shows the necessary time for heating the most upstream zone up to 400° C. by combustion of the complementary flame opening 7.

TABLE 1

|  | Time (sec) |
| --- | --- |
| Example 1 | 50 |
| Example 2 | 50 |
| Example 3 | 43 |
| Comparative 1 | 100 |
| Comparative 2 | 32 |

From Table 1, it is understood that in the case of the catalyst device according to the present invention, a relatively short time is necessary to preheat the catalyst device up to a temperature at which the catalyst device carries out the catalyst combustion, due to the composite structure comprising the paper layer mainly composed of the inorganic fibers and the thin metal layer. On the other hand, in the case of a conventional type device as shown in Comparative 1, it takes a relatively long time. However, the single structure of Comparative 2 takes the shortest time.

Furthermore, Table 2 shows a result of the life time test.

TABLE 2

|  | Combustion Time (h) | | | | | |
| --- | --- | --- | --- | --- | --- | --- |
|  | 0 | 1000 | 2000 | 3000 | 4000 | 5000 |
| Example 1 | 4.7 | 3.9 | 3.6 | 3.5 | 3.4 | 3.3 |
| Example 2 | 4.7 | 4.0 | 3.7 | 3.5 | 3.5 | 3.4 |
| Example 3 | 4.8 | 3.6 | 3.4 | 3.3 | 3.2 | 3.1 |
| Comparative 1 | 4.5 | 3.6 | 3.4 | 3.4 | 3.3 | 3.2 |
| Comparative 2 | 5.0 | 1.7 | 1.2 | no | no | no |

In the case of Comparative 2, although the maximum fuel consumption/minimum fuel consumption ratio is large since the primary combustion property is good because of the whole inorganic fiber construction, the reaction heat generated at the upstream side of the catalyst device can not be transferred to the downstream side, which causes the highest temperature and thus the largest heat load to occur at the upstream side, resulting in the start of a remarkable deterioration at 1000 hours and a complete disappearance of the good combustion range. On the other hand, the catalyst devices according to Examples 1 to 3 have the same life performance as Comparative 1 or a somewhat superior life performance after 5000 hours. Among the Examples, Example 2 has the longest life time and Example 1 has a next longest.

FIG. 5 shows a temperature distribution from the upstream side to the downstream side of the catalyst devices of Example 1, and Comparative examples 1 and 2.

As the catalyst device according to the present invention is characterized in the composite construction comprising the paper layer 2 mainly composed of heat-resistant inorganic fibers and the thin metal layer 1, a corrugated structure is most suitable to mass-production.

In the case of Examples 1 and 2, the layer to be corrugated comprises two layers alternatively laminated. The layer to be corrugated may be comprised of three layers in which the thin metal layer is sandwiched between the paper layers. In the latter case, there may be used a thinner paper layer than that of the former case, considering heat balance with the thin metal layer. For example, the latter case can provide a similar performance as the former case by using a paper layer having half the thickness of the former paper layer. In order to consider the heat balance, the temperature distribution can be used. It is found that the paper layer provided with catalyst metal has a good heat balance when the bulk density is 1.2 g/cc or less, preferably 0.8 g/cc or less. In order to provide it with such a bulk density, the porosity of the paper layer needs to be more than 50% and the weight ratio of the heat-resistant inorganic particles such as $BaO.Al_2O_3.CeO_2$ and the inorganic fibers is preferably 0.5 to 1.5 (particles/fiber). If the ratio is below 0.5, the catalyst metal weight is too small to maintain the performance. On the other hand, if the ratio is over 1.5, the bulk density and thus the heat capacity of the paper layer is too large to demonstrate the performance of the paper layer. Further, it is found that the practical lower limit of the bulk density is 0.3 g/cc since the mechanical strength is improved by connection of the thin metal layer.

The corrugated catalyst layer can be made by laminating the paper layer 2 containing water on the metal layer 1 and heating the composite layers since alumina sol contained in the paper layer acts as a bonding agent. The Fourdrinier machine can make a uniform paper layer of more than 20 μm.

In Example 3 in which sectional wave shaped paper layers and flat thin metal layers are alternatively laminated, sectional wave shaped thin metal layers and flat paper layers may be alternatively laminated to form a corrugated structure. In comparison with Examples 1 and 2, the paper layer needs more mechanical strength such as that obtained by the bulk density of at least 0.5 g/cc, preferably more than 0.8 g/cc. Further, the thin metal layer needs somewhat more thickness in order to improve the mechanical strength. For example, the paper layer preferably has a thickness of more than 0.3 mm. In this structure, the requirement of the bulk density depends on usage conditions of the catalyst metal. In general, if the bulk density is below 0.5 g/cc, it is too brittle to resist a reasonable impact. If the bulk density is over 1.5 g/cc, the performance of the paper layer can not be attained. In order to make the bulk density of the paper layer in a range of 0.5 to 1.5 g/cc, the inorganic particle inorganic fiber weight ratio must be set in a range of 0.5 to 2.0.

In a process for making the catalyst device, when the corrugated structure is first assembled, the catalyst metal can be carried on both the paper layer 2 and the metal layer 1. The catalyst metal may be carried on the paper layer and then the paper layers are laminated on the thin metal layer. The former case is a little superior to the latter case with respect to the life time, although the latter case is much superior to the conventional case having a corrugated metal structure on which the catalyst metal is carried.

In the present specification, referring to the paper layer as being mainly composed of the heat-resistant inorganic fibers means that the paper layer contains a small volume of inorganic sol such as alumina sol or inorganic materials to be able to be sintered at a temperature of less than 1000° C. such as alminoslicate. The blend ratio is preferably about 5 wt. % or less of the inorganic fiber in order to improve the mechanical strength without lowering the bulk density. In place of the alumina/silica fiber used in the Examples as the heat-resistant inorganic fiber, other heat-resistant fiber such as alumina, silica, zirconia and so on may be used. Considering the production cost, alumina/silica fiber is the best material. The best mixture ratio of alumina and silica is 60 wt. % more or less of alumina and 40 wt. % more or less of silica. The paper layer refers to a thin paper such as one which has a thickness of about 1 mm or less since a thickness of over 1 mm causes poor heat transmission even if the thin metal layer is attached thereto. In the case of the sandwiched composite in which a pair of paper layers are laminated at the opposite sides of the thin metal layer, 0.5 mm or less of thickness is preferable.

As the thin metal layer, an Fe-Cr-Al sheet is preferable, and a metal sheet comprising Cr 20 wt. %, Al 5 wt. % and the balance Fe is especially preferable with respect to heat-resistance and acid-resistance. The thickness of the metal plate is preferably 100 μm or less since if it is over 100 μm, it takes a long time to preheat the catalyst device. On the other hand, a thickness of less than 20 μm make it to brittle to resist heat deformation.

In the present invention, the catalyst metal preferably comprises a noble metal component which is carried on an activated alumina. The catalyst metal may contain alkaline earth metal in order to improve the heat-resistance of the activated alumina and also may contain a rare earth metal oxide or zirconia as a co-catalyst.

As apparent from the description, according to the present invention, there is provided the catalyst device which is able to be preheated in a short time and in which the reaction heat is uniformly distributed, such that the catalyst device has a long stable performance.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A catalyst device comprising:

a plurality of flat sheets alternatingly laminated with a plurality of corrugated sheets so as to form a plurality of pairs of adjacent sheets, each of said pairs comprising one of said flat sheets and one of said corrugated sheets, and so as to form multiple gas flow channels along a longitudinal direction between said flat sheet and said corrugated sheet of each of said pairs of adjacent sheets;

wherein, for each of said pairs of adjacent sheets, one of said flat sheet and said corrugated sheet comprises a paper layer mainly composed of inorganic heat-resistant fibers carrying catalyst metal dispersed thereon, and the other of said flat sheet and said corrugated sheet comprises a thin metal layer.

2. A catalyst device as recited in claim 1, wherein for each of said pairs of adjacent sheets, at least one of said flat sheet and said corrugated sheet comprises both a paper layer mainly composed of inorganic heat-resistant fibers carrying catalyst metal dispersed thereon and a thin metal layer laminated to said paper layer.

3. A catalyst device as recited in claim 2, wherein the catalyst metal dispersed on said paper layer ranges from 0.3 to 1.2 g/cc of the bulk density of said paper layer.

4. A catalyst device as recited in claim 2, wherein said paper layer has a thickness of 0.02 to 1 mm, and said thin metal layer has a thickness of 0.02 to 0.1 mm.

5. A catalyst device as recited in claim 1, wherein for each of said pairs of adjacent sheets, each of said flat sheet and said corrugated sheet comprises both a paper layer mainly composed of inorganic heat-resistant fibers carrying catalyst metal dispersed thereon and a thin metal layer laminated to said paper layer.

6. A catalyst device as recited in claim 5, wherein said paper layer has a thickness of 0.02 to 1 mm, and said thin metal layer has a thickness of 0.02 to 0.1 mm.

7. A catalyst device as recited in claim 1, wherein for each of said pairs of adjacent sheets, one of said flat sheet and said corrugated sheet consists of a single paper layer mainly composed of inorganic heat-resistant fibers carrying catalyst metal dispersed thereon, and the other of said flat sheet and said corrugated sheet consists of a single thin metal layer.

8. A catalyst device as recited in claim 7, wherein said single paper layer has a thickness of 0.3 to 1 mm, and said single thin metal layer has a thickness of 0.02 to 0.1 mm.

9. A catalyst device as recited in claim 7, wherein the catalyst metal dispersed on said single paper layer ranges from 0.3 to 1.2 g/cc of the bulk density of said single layer.

10. A catalyst device as recited in claim 1, wherein for each of said pairs of adjacent sheets, said flat sheet consists of a single paper layer mainly composed of inorganic heat-resistant fibers carrying catalyst metal dispersed thereon, and said corrugated sheet consists of a single thin metal layer.

11. A catalyst device as recited in claim 1, wherein
said paper layer has a thickness of 0.3 to 1 mm, and said thin metal layer has a thickness of 0.02 to 0.1 mm.

12. A catalyst device as recited in claim 1, wherein
said catalyst metal is a noble metal and is carried on the inorganic heat-resistant fibers.

13. A combustion apparatus for burning a fuel and air mixture, said apparatus comprising:

a main body having a combustion zone therein and an outlet;

a fuel and air mixture supply device mounted to said main body and operably connected to said combustion zone;

a catalyst device mounted in said combustion zone and between said fuel and air mixture supply device and said outlet;

wherein said catalyst device comprises a plurality of flat sheets alternatingly laminated with a plurality of corrugated sheets so as to form a plurality of pairs of adjacent sheets, each of said pairs comprising one of said flat sheets and one of said corrugated sheets, and so as to form multiple gas flow channels along a longitudinal direction between said flat sheet and said corrugated sheet of each of said pairs of adjacent sheets; and wherein, for each of said pairs of adjacent sheets, one of said flat sheet and said corrugated sheet comprises a paper layer mainly composed of inorganic heat-resistant fibers carrying catalyst metal dispersed thereon, and the other of said flat sheet and said corrugated sheet comprises a thin metal layer.

14. A combustion apparatus as recited in claim 13, wherein
for each of said pairs of adjacent sheets, at least one of said flat sheet and said corrugated sheet comprises both a paper layer mainly composed of inorganic heat-resistant fibers carrying catalyst metal dispersed thereon and a thin metal layer laminated to said paper layer.

15. A combustion apparatus as recited in claim 14, wherein
the catalyst metal dispersed on said paper layer ranges from 0.3 to 1.2 g/cc of the bulk density of said paper layer.

16. A combustion apparatus as recited in claim 15, wherein
said paper layer has a thickness of 0.02 to 1 mm, and said thin metal layer has a thickness of 0.02 to 0.1 mm.

17. A combustion apparatus as recited in claim 13, wherein
for each of said pairs of adjacent sheets, each of said flat sheet and said corrugated sheet comprises both a paper layer mainly composed of inorganic heat-resistant fibers carrying catalyst metal dispersed thereon and a thin metal layer laminated to said paper layer.

18. A combustion apparatus as recited in claim 17, wherein
said paper layer has a thickness of 0.02 to 1 mm, and said thin metal layer has a thickness of 0.02 to 0.1 mm.

19. A combustion apparatus as recited in claim 13, wherein
for each of said pairs of adjacent sheets, one of said flat sheet and said corrugated sheet consists of a single paper layer mainly composed of inorganic heat-resistant fibers carrying catalyst metal dispersed thereon, and the other of said flat sheet and said corrugated sheet consists of a single thin metal layer.

20. A combustion apparatus as recited in claim 19, wherein
said single paper layer has a thickness of 0.3 to 1 mm, and said single thin metal layer has a thickness of 0.02 to 0.1 mm.

21. A combustion apparatus as recited in claim 19, wherein
the catalyst metal dispersed on said single paper layer ranges from 0.3 to 1.2 g/cc of the bulk density of said single layer.

22. A combustion apparatus as recited in claim 13, wherein
for each of said pairs of adjacent sheets, said flat sheet consists of a single paper layer mainly composed of inorganic heat-resistant fibers carrying catalyst metal dispersed thereon, and said corrugated sheet consists of a single thin metal layer.

23. A combustion apparatus as recited in claim 13, wherein
said paper layer has a thickness of 0.3 to 1 mm, and said thin metal layer has a thickness of 0.02 to 0.1 mm.

24. A combustion apparatus as recited in claim 13, wherein
said catalyst metal is a noble metal and is carried on the inorganic heat-resistant fibers.

\* \* \* \* \*